United States Patent
Hempel et al.

(10) Patent No.: US 12,472,945 B2
(45) Date of Patent: Nov. 18, 2025

(54) VEHICLE CONTROL SYSTEM AND METHOD FOR OPERATING A DRIVING FUNCTION AT A TRAFFIC NODE

(71) Applicant: Bayerische Motoren Werke Aktiengesellschaft, Munich (DE)

(72) Inventors: Wolfgang Hempel, Sinzing (DE); Martin Liebner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 177 days.

(21) Appl. No.: 18/547,322

(22) PCT Filed: Feb. 18, 2022

(86) PCT No.: PCT/EP2022/054091
§ 371 (c)(1),
(2) Date: Aug. 21, 2023

(87) PCT Pub. No.: WO2022/175461
PCT Pub. Date: Aug. 25, 2022

(65) Prior Publication Data
US 2024/0132068 A1 Apr. 25, 2024
US 2024/0227798 A9 Jul. 11, 2024

(30) Foreign Application Priority Data
Feb. 22, 2021 (DE) .................... 10 2021 104 120.1

(51) Int. Cl.
*B60W 30/14* (2006.01)
*B60W 30/18* (2012.01)
(Continued)

(52) U.S. Cl.
CPC .... *B60W 30/146* (2013.01); *B60W 30/18154* (2013.01); *B60W 50/0097* (2013.01);
(Continued)

(58) Field of Classification Search
CPC .............. B60W 30/14; B60W 30/146; B60W 30/18154; B60W 30/18159;
(Continued)

(56) References Cited

U.S. PATENT DOCUMENTS 11,142,213 B2 10/2021 Kagerer et al.
2016/0318490 A1 11/2016 Ben Shalom
(Continued)

FOREIGN PATENT DOCUMENTS

DE 10 2013 220 662 A1 4/2015
DE 10 2014 205 953 A1 10/2015
(Continued)

OTHER PUBLICATIONS

PCT/EP2022/054091, International Search Report dated Jun. 7, 2022 (Two (2) pages).
(Continued)

*Primary Examiner* — Atul Trivedi
(74) *Attorney, Agent, or Firm* — Crowell & Moring LLP

(57) ABSTRACT

A vehicle control system for operating a driving function for the automated longitudinal and/or lateral control of a motor vehicle at a traffic node. The system includes sensors that provide situational data, and a control unit. The control unit identifies a lane in which the vehicle is located, in an approach road to the node, based on the situational data. The control unit determines whether at least one signal generator of a signaling unit of the node is relevant to a driving maneuver of the vehicle at the node, based on the identified lane. The control unit operates the driving function at the node based on whether at least one signal generator is relevant to the driving maneuver of the vehicle at the node.

14 Claims, 3 Drawing Sheets

(51) Int. Cl.
 *B60W 50/00* (2006.01)
 *B60W 50/14* (2020.01)
(52) U.S. Cl.
 CPC ....... *B60W 50/14* (2013.01); *B60W 2050/146* (2013.01); *B60W 2552/53* (2020.02); *B60W 2555/60* (2020.02); *B60W 2556/40* (2020.02)
(58) Field of Classification Search
 CPC ............ B60W 50/0097; B60W 50/14; B60W 2050/146; B60W 2552/53; B60W 2555/60; B60W 2556/40; B60W 2540/215; B60W 50/082
 USPC .......................................................... 701/93
 See application file for complete search history.

(56) References Cited

U.S. PATENT DOCUMENTS

| | | | | |
|---|---|---|---|---|
| 2020/0208998 | A1* | 7/2020 | Xiang | G06F 16/29 |
| 2021/0001877 | A1* | 1/2021 | Han | B60W 40/02 |
| 2021/0078580 | A1* | 3/2021 | Mangal | G05D 1/65 |
| 2021/0086767 | A1* | 3/2021 | Matsunaga | B60W 10/20 |
| 2021/0134156 | A1* | 5/2021 | Lee | G08G 1/166 |
| 2021/0237776 | A1* | 8/2021 | Hashimoto | B60W 40/09 |
| 2021/0248915 | A1* | 8/2021 | Jacobus | H04W 4/02 |
| 2021/0269056 | A1* | 9/2021 | Zhu | G05D 1/0212 |
| 2021/0271254 | A1* | 9/2021 | Chen | G06N 20/00 |
| 2021/0364305 | A1* | 11/2021 | Rizk | G01C 21/3605 |
| 2022/0083065 | A1* | 3/2022 | Liu | B60W 60/001 |
| 2023/0174060 | A1* | 6/2023 | Oguro | G06V 20/588 |
| 2023/0365133 | A1* | 11/2023 | Olsson | B60W 40/072 |
| 2024/0199010 | A1* | 6/2024 | Shimizu | B60W 30/12 |
| 2024/0199030 | A1* | 6/2024 | Tamura | B60W 40/06 |
| 2024/0416950 | A1* | 12/2024 | Zeiynali Farid | G08G 1/0116 |
| 2025/0108823 | A1* | 4/2025 | Yahata | B60K 35/28 |
| 2025/0187601 | A1* | 6/2025 | Suh | B60W 30/18163 |

FOREIGN PATENT DOCUMENTS

| | | | |
|---|---|---|---|
| DE | 10 2015 204 122 A1 | 11/2015 | |
| DE | 10 2016 206 852 A1 | 10/2017 | |
| DE | 10 2017 203 654 A1 | 9/2018 | |
| DE | 10 2018 210 125 A1 | 12/2019 | |
| DE | 10 2019 004 481 A1 | 1/2020 | |
| DE | 10 2019 217 144 A1 | 5/2021 | |
| EP | 1 772 339 A1 | 4/2007 | |
| EP | 3916696 A1 * | 12/2021 | ............. H04L 67/12 |
| GB | 2510698 A | 8/2014 | |
| WO | WO-2021125706 A1 * | 6/2021 | .......... B60W 40/076 |

OTHER PUBLICATIONS

German Search Report issued in German application No. 10 2021 104 120.1 dated Sep. 3, 2021, with Statement of Relevancy (Eight (8) pages).

"Rechtsfolgen zunehmender Fahr-zeugautomatisierung", Bundesanstalt fuer Strassenwesen (BASt) [German Federal Highway Research Institute], Forschung kompakt [Research News], Edition Nov. 2012 with English Abstract (Thirty Seven (37) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, (Thirty (30) pages).

* cited by examiner

VEHICLE CONTROL SYSTEM AND METHOD FOR OPERATING A DRIVING FUNCTION AT A TRAFFIC NODE

This application is a 371 of International Application No. PCT/EP2022/054091, filed Feb. 18, 2022 which claims priority under 35 U.S.C. § 119 from German Patent Application No. 10 2021 104 120.1, filed Feb. 22, 2021, the entire disclosure of which is herein expressly incorporated by reference.

BACKGROUND AND SUMMARY OF THE INVENTION

The invention relates to a vehicle control system and to a corresponding method for operating a driving function of a vehicle at a traffic node.

A vehicle can comprise one or more driving functions which assist the driver of the vehicle in the control, particularly the longitudinal and/or lateral control, of the vehicle. An exemplary driving function for supporting the longitudinal control of a vehicle is the Adaptive Cruise Control (ACC) function, which can be employed for the longitudinal control of the vehicle at a specified setpoint or target driving speed and/or with a specified target clearance to a leading vehicle which is driving ahead of the vehicle. The driving function can also be employed in conjunction with a signaling unit (particularly a traffic light) at a traffic node (for example at an intersection), in order to execute automated longitudinal control, for example an automatic deceleration at the signaling unit.

A signaling unit can comprise various signal generators, which are assigned e.g. to different directions of travel at a traffic node. In the context of the driving function, it is intended that only the one or more signal generators should be considered which are relevant to the direction of travel planned by the driver, or to the driving maneuver which is planned by the driver of the vehicle.

The present document addresses the technical object of the efficient and reliable detection of the driving intention of the driver of a vehicle at an approaching node, particularly for the enhancement of the quality of a driving function for automatic longitudinal control at the node.

This object is fulfilled by each of the individual independent claims. Advantageous embodiments are described inter alia in the dependent claims. It is hereby observed that additional features of a patent claim which is dependent upon an independent patent claim, in the absence of the features of the independent patent claim, or in combination with only a proportion of the features of the independent claim, can form a standalone invention which is independent of all the features of the independent patent claim, and which can be the subject matter of an independent claim, a divisional application or a subsequent application. The same applies correspondingly to the technical instruction described in the description, which can form an invention which is independent of the features of the independent patent claims.

According to one aspect, a vehicle control system is described for operating a driving function for the automated longitudinal and/or lateral control of a motor vehicle at a traffic node or highway node (particularly at an intersection). The driving function can be configured to execute the automated deceleration of the vehicle at a stop line of a signaling unit of the node (if the relevant signal generator of the signaling unit for the vehicle is at "red") and/or to execute the automated longitudinal control of the vehicle through the node (if the relevant signal generator for the vehicle is at "green"). Automated longitudinal control can be executed by means of a distance and/or speed controller.

The vehicle control system is designed to identify the lane in which the vehicle is located, in an approach road to the node. The approach road to the node can comprise a plurality of different lanes. The number of lanes can be indicated by map data (i.e. on a digital map) with reference to the node. Map data can further indicate the spatial profile of individual lanes in the approach road to the node. Map data can, moreover, indicate information with respect to the signaling unit (particularly the light signal installation) on the approach road to the node.

The lane in which the vehicle is located can be identified on the basis of positional data from a global navigation satellite system (GNSS). Alternatively or additionally, the lane in which the vehicle is located can be identified on the basis of one or more landmarks (e.g. a lane marking, a signaling unit, a traffic sign, a post, etc.) in the environment of the node.

As indicated above, map data can indicate the profile of the different lanes in the approach road to the node upon which the vehicle is traveling. The lane in which the vehicle is located can then be identified in a particularly accurate and reliable manner on the basis of map data, particularly on the basis of the profile of lanes displayed.

The vehicle control system can be designed to identify positional data with respect to the position of the vehicle relative to the lanes of the approach road to the node upon which the vehicle is traveling. In particular, positional data can be determined: on the basis of positions of one or more landmarks which are indicated in map data, particularly of one or more lane markings, posts, traffic signs and/or signal generators; on the basis of the relative position of the vehicle vis-à-vis the one or more landmarks at one or more sequential time points; on the basis of one or more sequential time points, with reference to a global position of the vehicle determined by means of a GNSS receiver; and/or on the basis of a positional change and/or positional adjustment of the vehicle between two or more time points identified by reference to a wheel speed sensor, an acceleration and/or rotational speed sensor and/or a sensor for the determination of a visual odometry of the vehicle. The lane upon which the vehicle is located can then be identified in a particularly accurate manner, on the basis of positional data thus determined.

Alternatively or additionally, map data can indicate a relative arrangement of various landmarks with respect to and/or in the environment of the node. In other words, map data can indicate the spatial arrangement of various landmarks relative to one another. This information can be described as a map-based relative arrangement.

The vehicle control system can be designed, on the basis of environmental data from one or more environmental sensors (particularly from one or more cameras) of the vehicle, to identify a sensor-based relative arrangement of various landmarks. In other words, the spatial arrangement of various landmarks relative to one another can be identified on the basis of environmental data.

The lane in which the vehicle is located can then be identified in a particularly accurate and reliable manner on the basis of the map-based arrangement and on the basis of the sensor-based arrangement. In particular, the sensor-based arrangement can be compared with the map-based arrangement, in order to permit the vehicle to locate itself relative to the map-based arrangement.

In particular, the vehicle control system can be designed (e.g. on the basis of environmental data) to identify the relative position of the vehicle vis-à-vis the map-based arrangement, and the relative position of the vehicle vis-à-vis the sensor-based arrangement. The lane in which the vehicle is located can then be identified on the basis of the relative positions of the vehicle thus determined vis-à-vis the map-based arrangement and vis-à-vis the sensor-based arrangement.

The vehicle control system is further designed, on the basis of the lane thus identified, to identify whether at least one signal generator of the signaling unit of the node is relevant to the (foreseeable and/or predicted) driving maneuver of the vehicle at the node. Alternatively or additionally, the vehicle control system can be designed, on the basis of the lane thus identified, to identify at least one (or, optionally, multiple) signal generator(s) of the signaliing unit (on the approach road) of the node, which is/are relevant to the (foreseeable and/or predicted) driving maneuver of the vehicle at the node. The signaling unit can comprise a plurality of different signal generators, which may be relevant to a number of different potential driving maneuvers at the node. Exemplary potential driving maneuvers include the following: a left turn-off maneuver; a straight-on maneuver; a right turn-off maneuver; and/or a U-turn maneuver. The association between potential driving maneuvers and the various signal generators can be indicated in map data with respect to the node. In particular, map data can indicate the relative (spatial) arrangement of individual signal generators in the signaling unit. Moreover, for each individual signal generator, map data can indicate the driving maneuver and/or the lane for which the respective signal generator is relevant.

The various positions, and particularly the relative arrangement of the various signal generators can thus be indicated in map data. The vehicle control system can be designed to identify the position of the signal generator which is relevant to the (foreseeable and/or predicted) driving maneuver of the vehicle at the node. The vehicle control system can moreover be designed, on the basis of the position and/or relative arrangement determined from map data, to identify the relevant signal generator from environmental data.

The vehicle control system can moreover be designed to identify the signaling status of the signal generator thus identified. The signaling status (particularly the color) of the signal generator can be identified on the basis of environmental data from one or more environmental sensors of the vehicle.

The vehicle control system is further designed to operate the driving function at the node, depending upon whether at least one signal generator at the node is relevant to the driving maneuver of the vehicle at the node, and/or in accordance with the signal generator thus detected. The driving function can be operated at the node, particularly in accordance with the detected signaling status (for example, the color) of the signal generator detected.

In particular, the vehicle control system can be designed, depending upon the signaling status of the signal generator detected (and/or depending upon whether any signal generator whatsoever is relevant to the driving maneuver of the vehicle at the node) to execute the automated longitudinal or lateral control of the vehicle across the node (e.g. if it is detected that the signal generator is "green"), or to execute the automated deceleration of the vehicle to a halt ahead of the stop line of the signaling unit (e.g. if it is detected that the signal generator is "red").

By the consideration of the lane in the operation of the driving function, the driving intention of the driver of the vehicle can be detected in a reliable manner, and the availability and quality of the driving function can be further enhanced.

The vehicle control system can be designed, on the basis of the lane detected, to predict the driving maneuver which is to be executed by the vehicle at the node. Map data can indicate e.g. which one or more driving maneuvers, and for which lane of the approach road to the node, are available, permissible and/or possible (e.g. entry to a right turn-off lane, a left turn-off lane, a straight-on lane, a U-turn lane, etc.). The driving maneuver of the vehicle associated with the lane can thus be determined on the basis of map data. In particular, the driving maneuver can be selected from a plurality of potential driving maneuvers. The relevant signal generator for the driving maneuver can then be detected, in a particularly accurate manner, on the basis of the predicted driving maneuver.

As described above, map data can indicate an association of the various signal generators of the signaling unit with different potential driving maneuvers at the node and/or with the various lanes on the approach road to the node. The signal generator which is relevant to the driving maneuver of the vehicle at the node can then be identified in a particularly reliable manner on the basis of map data, particularly on the basis of the association indicated in map data.

The vehicle control system can be designed, on the basis of environmental data from one or more environmental sensors of the vehicle, to establish a sensor-based environmental model of the node. Moreover, map data can display a map-based environmental model of the node. In the environmental model, respective landmarks in the environment of the node can be displayed. On the basis of the sensor-based environmental model, and on the basis of the map-based environmental model, particularly on the basis of a comparison of the sensor-based environmental model with the map-based environmental model, the lane can then be identified on which the vehicle is located and/or the signal generator can be identified which is relevant to the driving maneuver of the vehicle at the node. By the comparison of sensor- and map-based environmental models, the quality of the driving function can be further enhanced.

According to a further aspect, a (road) motor vehicle (in particular a passenger car, or a heavy goods vehicle, or a bus, or a motorcycle) is described, which comprises the vehicle control system described in the present document.

According to a further aspect, a method is described for operating a driving function for the automated longitudinal and/or lateral control of a motor vehicle at a node. The method comprises the detection of a lane of an approach road to the node in which the vehicle is located. The method further comprises the detection, on the basis of the lane thus detected, of a signal generator of a signaling unit which is relevant to the driving maneuver of the vehicle at the node (or detection as to whether any signal generator whatsoever of the signaling unit is relevant to the driving maneuver of the vehicle). The method further comprises the operation of the driving at the node in accordance with the signal generator thus detected (or depending upon whether any or no signal generator is relevant to the driving maneuver of the vehicle).

According to a further aspect, a software (SW) program is described. The SW program can be designed for running on a processor (e.g. on a control device of a vehicle), in order to execute the method described in the present document.

According to a further aspect, a storage medium is described. The storage medium can comprise a SW program which is designed for running on a processor, in order to execute the method described in the present document.

As indicated above, the driving function described in the present document is particularly configured for the automated longitudinal control of a vehicle at, or in conjunction with a signaling unit (particularly with a signal generator of a signaling unit). The driving function can be configured in accordance with SAE level 2. In other words, the driving function can optionally deliver automated driving and or assisted driving (with respect to longitudinal control) in accordance with SAE level 2. The driving function can be restricted to longitudinal control of the vehicle. During the operation of the driving function, lateral control can optionally be executed manually by the driver, or can be provided by a further and/or separate driving function (e.g. by a lane departure warning system).

In the context of the driving function, the vehicle can be longitudinally controlled, in an automated manner, in accordance with a setpoint or target speed and/or in accordance with a target clearance to a leading vehicle which is driving (directly) ahead of the vehicle. To this end, the driving function can comprise a speed controller, by means of which the actual driving speed of the vehicle can be adjusted and, in particular, regulated in accordance with the setpoint or target speed. Alternatively or additionally, a distance controller can be provided, by means of which the actual distance of the vehicle from the vehicle ahead can be adjusted and, in particular, regulated in accordance with the target distance. If no relevant leading vehicle is present, or if the leading vehicle is traveling more rapidly than the setpoint or target speed, the driving speed of the vehicle can be regulated. Alternatively or additionally, if the leading vehicle is traveling more slowly than the setpoint or target speed, the distance of the vehicle from the vehicle ahead can be regulated. The driving function can thus be designed to deliver an Adaptive Cruise Control (ACC) assisted driving function.

The vehicle can comprise a user interface for interaction with a user, particularly with a driver of the vehicle. The user interface can comprise one or more control elements which permit the user to set the setpoint or target speed and/or the target distance. Alternatively or additionally, the one or more control elements can permit the user to confirm a previously defined setpoint and/or target speed and/or a previously defined setpoint distance of the vehicle for the operation of the driving function. The one or more control elements can be configured to be actuated by a hand and/or by a finger of the vehicle driver. Alternatively or additionally, the one or more control elements can be arranged on a steering means (particularly on a steering wheel or on a steering yoke) of the vehicle.

An exemplary control element (particularly a plus/minus control element) is a key and/or a rocker, by means of which the setpoint and/or target speed or the target distance can be increased or decreased. A further exemplary control element (in particular, a set control element) is a key, by means of which a current driving speed of the vehicle can be established as the setpoint or target speed, or by means of which a current distance of the vehicle from the leading vehicle can be established as the target distance. A further exemplary control element (in particular, a resume control element) is a key, by means of which a previously set setpoint and/or target speed or a previously set target distance can be reconfirmed or reactivated.

The user interface can further comprise one or more output elements (e.g. a screen and/or a loudspeaker and/or a vibrating element), by means of which outputs can be delivered to the user of the vehicle.

The driving function can moreover be designed, in the automated longitudinal control of the vehicle, to consider one or more signaling units on the carriageway (particularly the highway) and/or on the driving route which is being negotiated by the vehicle. To this end, a signaling unit can be provided which identifies the approach to a node (particularly an intersection) in the road network upon which the vehicle is traveling. The definition of this approach can be temporally variable (as in the case of e.g. a light signal installation, for example a traffic light, having one or more different signal groups (each comprising one or more signal generators) for one or more different directions of travel of the vehicle at the node), or can be fixed (as in the case of e.g. a traffic sign, for example a stop sign).

During the operation of the driving function, data with respect to an approaching signaling unit (at a node) in the direction of travel of the vehicle) can be identified. These data can comprise map data with respect to signaling units and/or nodes in the road network upon which the vehicle is traveling. Map data can respectively comprise one or more attributes for the individual signaling units. The one or more attributes for a signaling unit can indicate or comprise the following:

the type of signaling unit, particularly with a distinction as to whether the signaling unit is a light signal installation or a traffic sign; and/or
   the number of different signal groups (and the number of signal generators per signal group) in the signaling unit for different directions of travel and/or for different lanes at the node of the road network at which the signaling unit is arranged, or with which the signaling unit is associated; and/or
   the position (e.g. the GPS coordinates) of the signaling unit and/or of the stop line of the signaling unit within the road network; and/or
   the relative distance from the stop line to the associated signaling unit; and/or
   the relative distance and/or the relative arrangement of the individual signal generators of the signaling unit in relation to one another.

The driving function can be designed, by the employment of a position sensor (e.g. a GPS or GNSS receiver) of the vehicle and/or by the employment of odometry, to identify the actual position (e.g. the current GPS or GNSS coordinates) of the vehicle within the road network. By reference to map data, a (e.g. the next) signaling unit on the route of travel of the vehicle, or on the approach road to an approaching node, can then be identified. Moreover, one or more map attributes can be determined with reference to the signaling unit thus detected.

Alternatively or additionally, data with respect to an approaching signaling unit (at a node) in the direction of travel of the vehicle can comprise environmental data with respect to the signaling unit, or can be identified on the basis of environmental data. Environmental data can be detected by one or more environmental sensors of the vehicle. Exemplary environmental sensors include a camera, a radar sensor, a Lidar sensor, etc. The one or more environmental sensors can be designed to detect sensor data (i.e. environmental data) with respect to the environment in the direction of travel of the vehicle.

The driving function can be designed, on the basis of environmental data (particularly on the basis of sensor data from a camera), to detect that a signaling unit is located in the direction of travel of the vehicle. To this end, e.g. an image analysis algorithm can be employed. The driving function can moreover be designed, on the basis of environmental data, to identify the type of signaling unit (e.g. a light signal installation or traffic sign). The driving function can moreover be designed, on the basis of environmental data, to identify the (signaling) status of the signaling unit with respect to permission for passage through the node which is associated with the signaling unit. In particular, the colors (green, amber or red) of the one or more signal groups of a light signal installation can be identified.

The driving function can be designed to consider a signaling unit thus detected in the automated longitudinal control of the vehicle. In particular, the driving function can be designed, on the basis of data with respect to the signaling unit thus detected, particularly on the basis of the detected color of a light signal or of a signal group of the signaling unit indicated by data, to determine whether or not the vehicle is required to stop at the signaling unit, particularly at the stop line of the signaling unit. For example, it can be detected that the vehicle is required to stop, on the grounds that the relevant signal group for the vehicle is red. Alternatively, it can be detected that the vehicle is not required to stop, on the grounds that the relevant signal group for the vehicle is green. In a further example, it can be detected that the vehicle is required to stop, on the grounds that the signaling unit is a stop sign.

The driving function can further be designed to initiate the automated stopping of the vehicle at the signaling unit detected, if it is determined that the vehicle is required to stop at the signaling unit. To this end, an automated deceleration process (down to a halt) can be initiated. The vehicle can thus be automatically guided to, or up to the stop line of the signaling unit. During the automated deceleration process, the driving function can automatically actuate one or more wheel brakes (e.g. one or more friction brakes or one or more regenerative brakes), in order to decelerate the vehicle (to a halt). The temporal characteristic of the deceleration thus initiated can be dependent upon the available braking distance to the signaling unit detected.

Alternatively or additionally, the driving function can be designed to initiate the automated longitudinal control of the vehicle past the signaling unit thus detected, particularly if it is determined that the vehicle is not required to stop at the signaling unit. Speed and/or distance control can thus continue in accordance with the setpoint or target speed and/or in accordance with the target clearance to the vehicle ahead.

The driving function can thus be designed to deliver an ACC driving function in consideration of signaling units. The driving function is also described in the present document as an Urban Cruise Control (UCC) driving function.

As indicated above, the driving function can be designed, in the context of the operation of the driving function, to execute the automated longitudinal control of the vehicle in accordance with a target speed and/or in accordance with a target clearance to a leading vehicle which is driving ahead of the vehicle. The driving function can further be designed, in the event that an (optionally detected) signaliing unit is not considered by the driving function, such that the vehicle is automatically longitudinally guided past the signaling unit, particularly across the stop line of the signaling unit and, in particular, independently of the color of a light signal of the signaling unit, in accordance with the target speed and/or in accordance with a target distance to the signaling unit. The driving function can thus be optionally operated (in the event of the non-consideration of a signaling unit) as though the signaling unit (and thus the associated node) did not exist.

The driving function can optionally permit the user of the vehicle to configure the driving function by means of the user interface (e.g. in a configuration menu). A setting can thus be optionally executed as to whether the driving function is to be operated in an automated mode or is to be operated in a manual mode.

In the automated mode, the driving function can be operated such that an approaching signaling unit, which is detected in the direction of travel, is automatically considered in the operation of the driving function (and optionally results in an automatic deceleration of the vehicle). In particular, the driving function can be designed, in the automated mode, to automatically consider a signaling unit which is detected on the basis of map data and/or environmental data, particularly with no confirmation by a user of the vehicle, in the automated longitudinal control of the vehicle (e.g. in order to initiate an automatic deceleration of the vehicle at the signaling unit detected, if required).

On the other hand, the driving function can be operated in a manual mode, such that the signaling unit detected is only considered in the automated longitudinal control of the vehicle (and, optionally, in the initiation of an automatic deceleration of the vehicle) further to confirmation by the user of the vehicle. In particular, the driving function can be designed, in the manual mode (via the user interface of the vehicle), to deliver an output by way of a proposal for the consideration of the signaling unit detected, for the attention of the user of the vehicle. For example, it can be indicated on the screen that a signaling unit has been detected, and that feedback from the user is required (in order to initiate consideration of the signaling unit in the automated longitudinal control of the vehicle). The signaling unit detected (in particular, the signaling status of the signaling unit) can then (and, in particular, only then) be considered in the automated longitudinal control of the vehicle at the signaling unit, if the proposal is accepted by the user (e.g. by the actuation of a control element, particularly of the set control element). Optionally, an automatic deceleration of the vehicle is then executed at the signaling unit detected. On the other hand, the driving function can be designed not to consider and/or to ignore the signaling unit detected (particularly the signaling status of the signaling unit) in the automated longitudinal control of the vehicle at the signaling unit, if the proposal is not accepted by the user. In this case, speed and/or distance control can continue (with no consideration of the signaling unit and, in particular, as though the signaling unit were not present).

By the provision of different (adjustable) modes for the operation of the driving function (particularly of the UCC driving function), the convenience of the driving function can be further enhanced.

The driving function can be configured to notify the user of the driving function of the status of the driving function by means of the user interface. In particular, the user of the driving function can be notified as to whether an approaching signaling unit, which is detected in the direction of travel, is or is not to be considered in the operation of the driving function, particularly in the automated longitudinal control of the vehicle.

The driving function can be designed (e.g. on the basis of map data and/or environmental data) to determine whether an approaching signaling unit in the direction of travel is or can be considered in the operation of the driving function, or otherwise. If the signaling unit is or can be considered, an availability output, in particular an availability display, can optionally be generated in order to notify the user to the effect that the approaching signaling unit is to be considered in the automated longitudinal control of the vehicle (and thus, if required, an automatic deceleration of the vehicle at the signaling unit is to be executed).

Alternatively or additionally, the driving function can be designed (if it is determined that the approaching signaling unit is not or cannot be considered in the driving function) to initiate (via the user interface) a non-availability output, in particular a non-availability display, in order to notify the user of the vehicle to the effect that the approaching signaling unit is not to be considered in the automated longitudinal control of the vehicle (and thus, additionally, no automatic deceleration of the vehicle is to be executed in response to the signaling status of the signaling unit).

By the generation of an availability and/or non-availability output, the convenience and security of the driving function can be further enhanced. Availability and/or non-availability outputs can respectively comprise an optical, acoustic and/or haptic output.

The driving function can be designed to determine a change in the signaling status of the signal group (or of the relevant signal generator) of the signaling unit which is relevant to the direction of travel or to the driving maneuver of the vehicle (e.g. during the approach of the vehicle to the signal group or while the vehicle is stationary at the signal group). For example, it can be detected that a phase change from red to green has been executed.

The driving function can moreover be designed (in response to a phase change thus detected) to initiate the communication of information with respect to the altered signaling status of the signal group of the signaling unit to the driver of the vehicle. For example, it can be initiated that, by means of an output element (in particular, on a screen) of the user interface, a symbol of the signaling unit detected (and, optionally, considered in automated longitudinal control) is displayed, for such time as the signal group assumes the color red. Further to the detection of a phase change to green, the symbol displayed can optionally be removed, or the output terminated. It can thus be reliably communicated to the driver of the vehicle that, e.g. further to the halting of the vehicle at the signaling unit, an (optionally automated) start-up process can be initiated (e.g. by the actuation of a control element on the user interface).

The driving function can be designed to generate the output of a take-over request for the attention of the driver of the vehicle, if the driving function is interrupted. For example, it can be detected that the automated longitudinal control (in accordance with the setpoint and/or target speed and/or in accordance with the target clearance) cannot be continued or is not to be continued. An interruption of the driving function can occur e.g. if the driver (significantly) intervenes in the longitudinal control of the vehicle (e.g. wherein the driver of the vehicle actuates the brake pedal or the accelerator pedal). The output of a take-over request (TOR) can then be generated for the attention of the driver of the vehicle. Longitudinal control must then be resumed by the driver of the vehicle. By the output of a take-over request, the safe operation of the vehicle can be enhanced.

In the context of the present document, the term "automated driving" is to be understood as driving with automated longitudinal or lateral control, or as autonomous driving with automated longitudinal and lateral control. Automated driving, for example, can involve long-term driving on a motorway, or short-term driving in the context of parking or maneuvering. The term "automated driving" encompasses automated driving with an arbitrary degree of automation. Exemplary degrees of automation are assisted driving, partially-automated, highly-automated or fully-automated driving. These degrees of automation have been defined by the Federal Highways Agency ("Bundesanstalt für Straßenwesen" or "BASt") (see BASt publication "Research abtracts", 11/2012 edition).

In assisted driving, the driver is continuously responsible for longitudinal or lateral control, whereas the system respectively assumes other functions, within certain limits. In partially-automated driving (PAD), the system assumes longitudinal and lateral control for a specific period of time and/or in specific situations, whereas the driver is required to monitor the system continuously, as per assisted driving. In highly-automated driving (HAD), the system assumes longitudinal and lateral control for a specific period of time, without the necessity for the continuous monitoring of the system by the driver; however, the driver must be capable of resuming control of the vehicle within a certain time interval. In fully-automated driving (FAD), for a specific application, the system can execute the automatic management of driving in all situations; in this application, a driver is no longer required. The four above-mentioned levels of automation correspond to SAE Levels 1 to 4, according to SAE Standard J3016 (SAE: Society of Automotive Engineering). For example, highly-automated driving (HAD) corresponds to Level 3, according to SAE Standard J3016. SAE J3016 further provides for SAE Level 5 as the highest level of automation, which is not included in the definition provided by the BASt. SAE Level 5 corresponds to driverless driving, in which the system can execute the automatic management of all situations during the entire journey, in the same way as a human driver; in general, a driver is no longer required. Aspects described in the present document particularly relate to a driving function or an assisted driving function, which is configured in accordance with SAE Level 2.

It should be observed that the methods, devices and systems described in the present document can be employed either in isolation, or in combination with other methods, devices and systems described in the present document. Moreover, any aspects of the methods, devices and systems described in the present document can be mutually combined in a variety of ways. In particular, the features of the claims can be mutually combined in a variety of ways.

The invention is described in greater detail hereinafter with reference to exemplary embodiments. In the figures:

DETAILED DESCRIPTION OF THE DRAWINGS

As indicated above, the present document addresses the enhancement of the reliability, the availability and/or the convenience of a driving function, particularly of an assisted driving system, of a vehicle, e.g. in conjunction with a signaling unit at a node of the carriageway upon which the vehicle is traveling. In particular, the present document addresses the reliable and accurate detection of the driving intention of the driver of the vehicle at a node, in the interests of improving the quality of the driving function.

Figure 1:
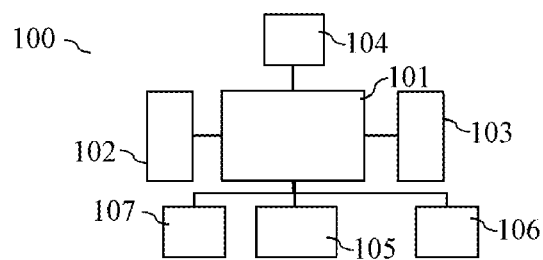
FIG. 1 shows exemplary components of a vehicle.

FIG. 1 shows exemplary components of a vehicle 100. The vehicle 100 comprises one or more environmental sensors 103 (e.g. one or more image cameras, one or more radar sensors, one or more Lidar sensors, one or more ultrasound sensors, etc.) which are designed to detect environmental data with respect to the environment of the vehicle 100 (particularly with respect to the environment ahead of the vehicle 100, in the direction of travel). The vehicle 100 further comprises one or more actuators 102, which are designed to intervene in the longitudinal and/or lateral control of the vehicle 100. Exemplary actuators 102 include the following: a braking system, a drive motor, a steering system, etc.

The control unit 101 (also described in the present document as a vehicle control system) can be designed, on the basis of sensor data from the one or more environmental sensors 103 (i.e. on the basis of environmental data), to deliver a driving function, particularly an assisted driving function. For example, on the basis of sensor data, an obstruction on the trajectory of travel of the vehicle 100 can be identified. Thereafter, the control unit 101 can actuate one or more actuators 102 (e.g. the braking system), in order to automatically decelerate the vehicle 100, such that any collision of the vehicle 100 with the obstruction is prevented.

Particularly in the context of automated longitudinal control of a vehicle 100, additionally to a leading vehicle, one or more signaling units (e.g. a light signal installation and/or a traffic sign) on the carriageway or highway on which the vehicle 100 is traveling is/are can be considered. In particular, the status of a light signal or traffic light can be considered, such that the vehicle 100 automatically executes a deceleration at a red traffic light which is relevant to a dedicated (planned) direction of travel, up to the stop line of the traffic light, and/or is accelerated (or optionally re-accelerated) at a green traffic light.

Light signal installations in different countries can be of highly diverse design and, moreover, can assume varying complexity with respect to the association of directions of travel with light signals. Thus, different directions of travel can be combined in a first group of signals, or can be regulated by one signal group, and another direction of travel can be regulated by another signal group. Repeated signals of a signal group can, moreover, be spatially located in different positions at an intersection. It can therefore be difficult for a control unit 101 to detect, on the basis of sensor data, which one or more signals (i.e. signal generators) of a light signal installation at an intersection are relevant to the planned direction of travel of the vehicle 100, and which are not (particularly if the vehicle 100 is still a relatively long distance from the light signal installation).

Figure 2A:
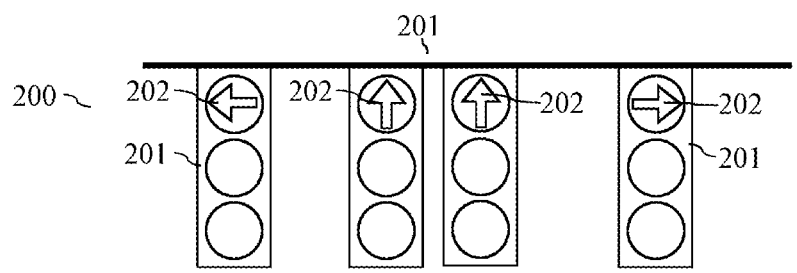
FIG. 2a shows an exemplary light signal installation.

FIG. 2a shows an exemplary light signal installation 200. The light signal installation 200 represented in FIG. 2a comprises four different signal generators 201, which are arranged at different positions in an approach to an intersection. The left-hand signal generator 201 comprises a left-pointing arrow 202, thereby indicating that this signal generator 201 applies to a vehicle turning left. The two central signal generators 201 comprise an upward-pointing arrow 202 (or no arrow 202), thereby indicating that these two signal generators 201 apply to travel straight ahead. The individual light signals of these two signal generators 201 form signal groups. The right-hand signal generator 201 moreover comprises a right-pointing arrow 202, thereby indicating that this signal generator 201 applies to a vehicle turning right.

The light signal installation 200 represented in FIG. 2a is only one example of a wide variety of potential different configurations of a light signal installation 200. A light signal installation 200 can assume a relatively large number of different characteristic features. Exemplary characteristics include the following:
the number of signal generators 201 and/or signal groups;
the positions of one or more signal generators 201; and/or
the assignment of a signal generator 201 to a potential direction of travel at an intersection.

Figure 2B:
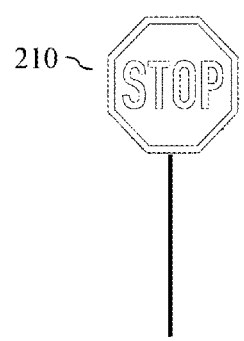
FIG. 2b shows an exemplary traffic sign.

FIG. 2b shows an exemplary stop sign, by way of a traffic sign 210, by means of which the approach to a traffic node, particularly to an intersection, is regulated. The control unit 101 of the vehicle 100 can be designed, on the basis of sensor data from the one or more environmental sensors 103 (i.e. on the basis of environmental data) and/or on the basis of digital map information (i.e. on the basis of map data), to detect a traffic sign 210 which is relevant to the approach of the vehicle 100 on the highway or carriageway on which the vehicle 100 is traveling.

Figure 3:
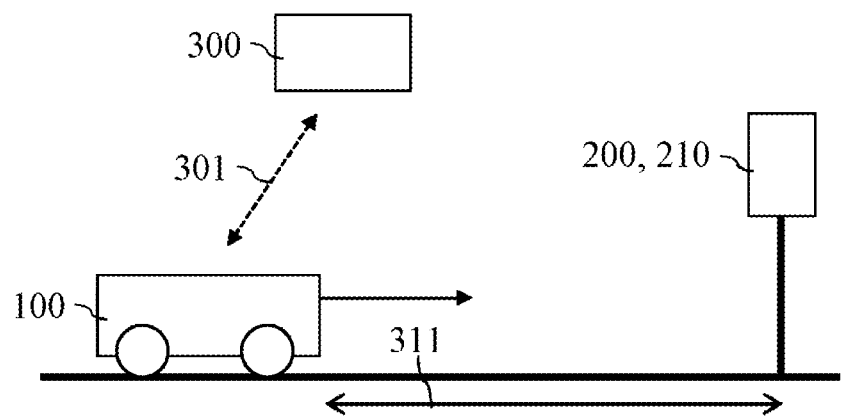
FIG. 3 shows an exemplary traffic situation.

FIG. 3 shows an exemplary representation of a vehicle 100 on a carriageway which is traveling towards a signaling unit 200, 210 (particularly a light signal installation 200 and/or a traffic sign 210). The one or more environmental sensors 103 of the vehicle 100 can be designed to detect sensor data (particularly image data) with respect to the signaling unit 200, 210. Sensor data can then be analyzed (e.g. by means of an image analysis algorithm), in order to determine the characteristics of one or more features of the signaling unit 200, 210. In particular, on the basis of sensor data, it can be determined whether the signaling unit 200, 210 is a light signal installation 200 or a traffic sign 210. It can further be determined which signal generator 201 of the light signal installation 200 is relevant to the (planned) direction of travel of the vehicle 100. Moreover, the (signaling) status of the relevant signal generator 201 (e.g. the color, for example, red, amber or green) can be determined.

The quality and/or reliability with which a characteristic of a feature of a signaling unit 200, 210 can be determined are typically dependent upon the distance 311 of the vehicle 100 from the signaling unit 200, 210. Moreover, current weather conditions typically exercise a substantial influence upon the quality and/or reliability of a feature of a characteristic thus determined. Moreover, this quality and/or reliability can differ for different features.

The vehicle 100 can comprise a memory unit 104, in which digital map information (i.e. map data) with respect to the road network on which the vehicle 100 is traveling is saved. Map data can be displayed as characteristic attributes of one or more signaling units 200, 210 in the highway or carriageway network. In particular, map data for a light signal installation 200 can indicate the association of the one or more signal generators 201 or signal groups with different potential directions of travel or driving maneuvers. In other words, map data can indicate which signal generator 201 or which signal group is responsible for the release of which direction of travel or which driving maneuver. Map data can optionally be received by means of a communication unit 105 of the vehicle 100, via a wireless communication link 301 (e.g. a WLAN or LTE communication link) from an off-vehicle unit 300 to the vehicle 100.

The control unit 101 of the vehicle 100 can be designed (e.g. on the basis of the current position of the vehicle 100 and on the basis of a planned driving route and/or on the basis of environmental data from the one or more environmental sensors 103), to determine that the vehicle 100 is approaching a signaling unit 200, 210 ahead. Moreover, the control unit 101, on the basis of (saved and/or received) map data, can determine the characteristics of one or more features of the approaching signaling unit 200, 210. In particular, on the basis of map data, it can be determined which signal generator 201 or which signal group of a light signal installation 200 is assigned to the current or planned direction of travel of the vehicle 100. Moreover, on the basis of environmental data, the current signaling status of the assigned signal generator 201 or of the assigned signal group can be determined. On the basis thereof, in a reliable and convenient manner, an automated driving function (e.g. an automated longitudinal control of the vehicle 100) can then be executed. In particular, by the consideration of map data, the characteristics of one or more relevant features of a signaling unit 200 can be determined, even at a relatively long distance 311 of the vehicle 100 from the signaling unit 200, as a result of which the reliability, availability and convenience of an automated driving function can be enhanced.

Figure 4:
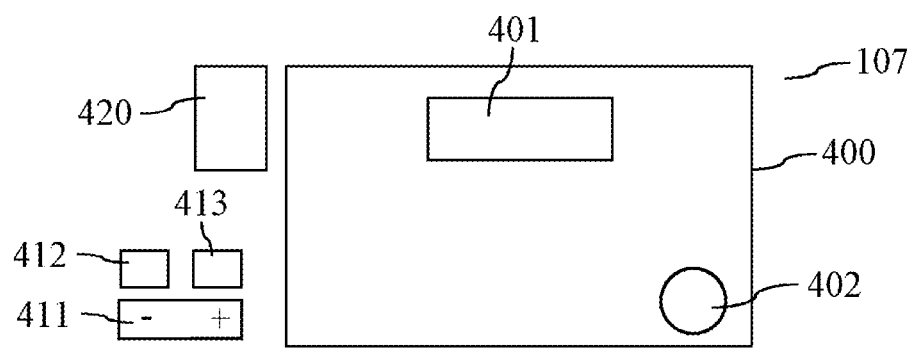
FIG. 4 shows an exemplary user interface.

The vehicle 100 typically comprises a user interface 107 having one or more control elements and/or having one or more output elements. FIG. 4 shows an exemplary user interface 107 having a display unit 400, particularly having a screen, for the output of optical information. On the display unit 400, e.g. by means of a display element 401, an output can be generated of a proposal for the automated control of the vehicle 100 at an approaching signaling unit 200, 210.

Alternatively or additionally, a display element 402 can optionally be provided, by means of which the status of the driving function (e.g. active or inactive) is represented.

Alternatively or additionally, by way of an output element, the user interface 107 can comprise at least one loudspeaker 420, by means of which an acoustic output (e.g. a warning tone) can be delivered to the driver of the vehicle 100.

The user interface 107 can moreover comprise one or more control elements 411, 412, 413, which permit the driver of the vehicle 100 to activate and/or parameterize the driving function. An exemplary control element is a rocker 411, which permits the driver to establish a setpoint speed (i.e. a target speed) for the vehicle 100 and, in particular, to execute an increase or reduction thereof. A further exemplary control element is a set control element 412, which permits the driver to set the current driving speed as the setpoint speed and/or to accept a proposal for the automatic control of the vehicle 100 at an approaching signaling unit 200, 210 (e.g. in the manual mode of the driving function). The user interface 107 can further comprise a resume control element 413, which permits the user e.g. to re-activate the driving function with a previously established setpoint speed.

The control unit 101 of the vehicle can be configured to deliver an automated longitudinal control of the vehicle 100 in an urban environment. This driving function can be described as an Urban Cruise Control (UCC) driving function. The driving function can be delivered in an automatic mode (aUCC) and/or in a manual mode (mUCC). Optionally, the driver is thus permitted, by means of the user interface 107, to establish whether the driving function is to be operated in the automatic mode or in the manual mode.

The control unit 101 of the vehicle 100 can be designed, on the basis of environmental data from the one or more environmental sensors 103 and/or on the basis of map data (in conjunction with positional data from the position sensor 106 of the vehicle 100), to detect an approaching signaling unit 200, 210 on the driving route of the vehicle 100. In the manual mode of the UCC driving function, the output of a proposal or a query can be generated via the user interface 107, as to whether the signaling unit 200, 210 is or is not to be considered in the automated longitudinal control of the vehicle 100. The driver of the vehicle 100 can then, e.g. by the actuation of the set control element 412, accept or reject/ignore the proposal. On the other hand, in the automatic mode of the UCC driving function, optionally, the signaling unit 200, 210 thus detected can automatically be considered (i.e. without the necessity for feedback from the driver) in the automated longitudinal control of the vehicle 100.

If the signaling unit 200, 210 thus detected is considered in the automated longitudinal control of the vehicle 100, (depending upon the type and/or signaling status of the signaling unit 200, 210), an automatic deceleration is initiated, such that the vehicle 100 (e.g. at a red traffic light or at a stop sign) is automatically brought to a halt. Moreover, (e.g. further to a change in the (signaling) status of the signaling unit 200, 210, for example further to a changeover to green), an automatic start-up of the vehicle 100 can be initiated. The vehicle 100 can then be automatically re-accelerated to the setpoint speed (in consideration of an established minimum or target clearance to a leading vehicle).

By means of the UCC driving function, the driver of a vehicle 100 can thus be permitted to employ the ACC function, even on a highway having a plurality of signaling units 200, 210 (without the necessity for the deactivation and reactivation of the ACC function at each of the individual signaling units 200, 210).

The control unit 101 can be designed, on the basis of environmental data and/or on the basis of map data, to determine whether an approaching signaling unit 200, 210 can or cannot be considered in automated longitudinal control. If it is determined that the approaching signaling unit 200, 210 cannot be considered in automated longitudinal control, an output (e.g. an optical output delivered via a display unit 400, 402) can be generated for the attention of the driver of the vehicle 100, in order to notify the driver of the vehicle 100 to the effect that the approaching signaling unit 200, 210 cannot be considered in automated longitudinal control. This display can be described as a "non-availability display". It is then the responsibility of the driver of the vehicle 100 to decelerate the vehicle 100, if required, at the approach to the signaling unit 200, 210 (e.g. on the grounds of a changeover of a traffic light to red, or on the grounds that the signaling unit 200, 210 is a stop sign).

The control unit 101 can further be designed, during the operation of the UCC driving function, to detect that no (further) automated longitudinal control of the vehicle 100 is possible (e.g. on the grounds of the execution of a manual intervention by the driver in the longitudinal control of the vehicle 100). In this case, an output of a take-over request (TOR) can be generated for the attention of the driver of the vehicle 100, in response to which the driver assumes the manual longitudinal control of the vehicle 100.

Figure 5:
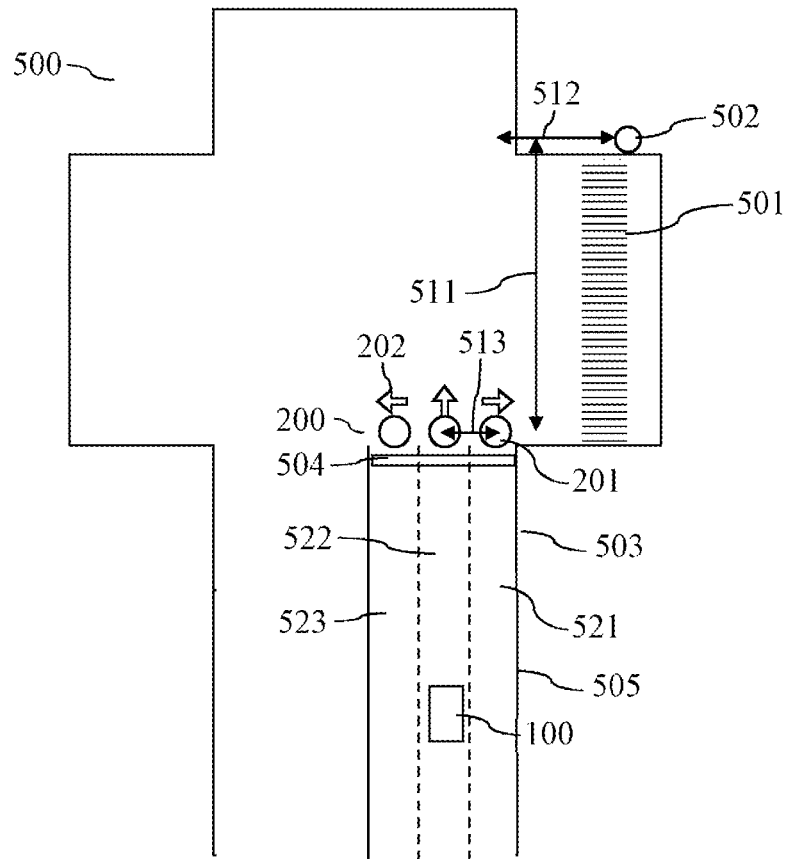
FIG. 5 shows an exemplary node.

FIG. 5 shows an exemplary node 500, having a signaling unit 200. The signaling unit 200 can comprise a plurality of signal generators 201, which are optionally assigned to different directions of travel 202. The vehicle 100 is located on an approach road 503 to the node 500, and can be designed to detect environmental data with respect to the environment of the vehicle 100. Environmental data (particularly image data from a camera) can thus indicate the signaling unit 200 (particularly the one or more signal generators 201 of the signaling unit 200) on the approach road 503 to the node 500, particularly to the intersection. Moreover, by means of the one or more environmental sensors 103 of the vehicle 100, one or more further landmarks in the environment of the vehicle 100, particularly at the node 500, can be indicated, including e.g. a pedestrian crossing light 502 at a pedestrian crossing 501 of the node 500, a stop line 504 on the approach road 503, a lane marking 505, etc.

Digital map data with respect to the node 500 can comprise information with respect to the relative arrangement of one or more landmarks at the node 500. For example, the longitudinal distance 512 and/or the lateral distance 511 between the signaling unit 200 and the pedestrian crossing light 502 can be indicated. Alternatively or additionally, the lateral distance 513 between the different signal generators 201 of the signaling unit 200 can be indicated. Map data can thus indicate geometrical data with respect to the (internal) geometry of the node 500. Geometrical data can thus be employed to determine the position of the vehicle 100 relative to the node 500.

As described above, in the operation of a driving function, particularly of the UCC driving function, the foreseeable direction of travel of the vehicle 100 at the node 500 can be considered. The foreseeable direction of travel can be determined e.g. on the basis of a planned driving route in a navigation system of the vehicle 100. The signaling status of the relevant signal generator 201 of the signaling unit 200 for the foreseeable direction of travel can then be determined, and considered in the operation of the driving function.

It can occur that, during the operation of the driving function, no planned driving route is present on the navigation system. In order to permit a nevertheless reliable anticipation of the direction of travel planned by the driver of the vehicle 100 at the node 500, the lane 521, 522, 523 on the approach road 503 to the node 500, in which the vehicle 100 is traveling to the node 500, can be determined and considered. Map data can comprise information with respect to:

the number of lanes 521, 522, 523 on the approach road 503 to the node 500; and/or the direction of travel at the node 500 associated with the respective lane 521, 522, 523 (e.g. a left turn-off lane, a straight-on lane, a right turn-off lane).

The vehicle control system 101 can be designed, on the basis of environmental data, to determine the lane 522, from a plurality of lanes 521, 522, 523, on which the vehicle 100 is traveling towards the node 500. The vehicle control system 101 can moreover be designed, on the basis of map data, to determine the direction of travel associated with the lane 522 in which the vehicle 100 is traveling. Moreover, on the basis of map data, the signal generator 201 can be identified which is relevant to the direction of travel thus determined and/or which is associated with the lane 522 in which the vehicle 100 is traveling. The driving function can then be operated in accordance with the signal generator 201 thus identified and, in particular, in accordance with the signaling status of the signal generator 201 thus identified.

The vehicle control system 101 can be designed to determine the lane 522 in which the vehicle 100 is traveling on the basis of geometrical data sourced from map data. In particular, on the basis of environmental data, one or more environmental data-based distance values can be determined with respect to the following:

the distance of the vehicle 100 to one or more landmarks 200, 201, 501, 502, 504, 505 in the environment of the vehicle 100; and/or the distance between various landmarks 200, 201, 501, 502, 504, 505 in the environment of the vehicle 100.

Moreover, on the basis of geometrical data sourced from map data, map data-based distance values 511, 512, 513 with respect to the distance between various landmarks 200, 201, 501, 502, 504, 505 in the environment of the vehicle 100 can be determined.

On the basis of the one or more environmental data-based distance values and the one or more map data-based distance values 511, 512, 513, the lane 522 in which the vehicle 100 is traveling towards the node 500 can then be identified in an accurate and robust manner.

The vehicle control system 101 can thus be designed to improve the anticipation of a driving maneuver at a node 500, wherein the one or more permissible directions of travel 202 on the lane 522 in which the vehicle 100 is currently located is/are considered in the detection function for the intention of the driver. The one or more permissible directions of travel in a lane 522 can be sourced from the digital map.

The current lane 522 can be determined, wherein the position of the vehicle 100 is compared with information on the profile of the lane 522. Positional determination can be executed by reference to a GNSS (global navigation satellite system). Alternatively or additionally, the exact position of the vehicle 100, particularly in relation to the lane profiles 521, 522, 523 saved in the digital map can be determined, wherein the relative position of the detected signal generator 201 (determined on the basis of environmental data) and/or the relative positions of one or more further landmarks 501, 502, 504, 505, such as e.g. traffic signs, lane markings, posts, etc. (determined on the basis of environmental data), are compared with the corresponding relative positions thereof in the digital map.

Alternatively or additionally, information from a plurality of sequential time increments can be considered, in order to determine the lane 522 in which the vehicle 100 is traveling. In particular, information with respect to the movement of the vehicle 100 between two sequential time increments (e.g. speed and/or yaw rate) can be considered.

On an approach road 503 to an intersection 500 having a light signal installation 200, it is particularly relevant for the UCC driving function to obtain information on the intention of the driver with respect to a driving maneuver at the intersection 500. In addition to directly available sources, such as an active navigation route or an active indicator light of the vehicle 100, the assignment of lanes permits the establishment of a robust assumption with respect to the planned driving maneuver. To this end, from the relative position of a plurality of landmarks 201, 501, 502, 504, 505 (such as e.g. traffic signs, traffic lights or lane markings) which are identified by dedicated on-board vehicle sensors 103, particularly by at least one camera, a sensor-based environmental model of the environment can be generated. This sensor-based environmental model can be compared with the positions of corresponding landmarks in a digital map (i.e. with a map-based environmental model), in order to establish an accurate position of the vehicle 100 within the digital map. On the basis of this positioning, in can be determined in which lane 522 the vehicle 100 is located. From the digital map, moreover, by reference to the routing of lanes at the intersection 500, it can be concluded which one or more driving maneuvers are assigned to the currently occupied lane 522 in the region of the intersection. From the digital map, by reference to this information, it can then be determined which signal group, and thus which one or more signal generators 201 are relevant to the intended driving maneuver.

Figure 6:
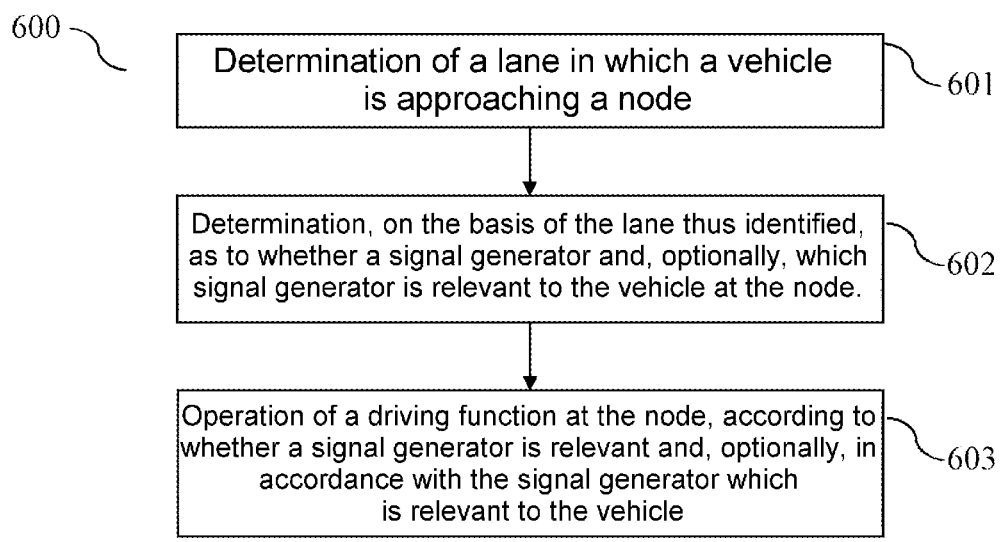
FIG. 6 shows an exemplary method for operating a driving function at a node.

FIG. 6 shows a flow diagram for an exemplary (optionally computer-implemented) method 600 for operating a driving function for the automated longitudinal and/or lateral control of a vehicle 100 at a node 500. The driving function, in particular, can be the UCC function described in the present document.

The method 600 comprises the determination 601 of the lane 522 in the approach road 503 to a node 500 in which the vehicle 100 is located. The lane 522 can be determined on the basis of environmental data and/or on the basis of map data.

The method 600 comprises the determination 602, on the basis of the lane 522 thus determined, as to whether at least one signal generator 201 of the (approaching) signaling unit 200 of the node 500 is relevant to a driving maneuver of the vehicle 100 at the node 500. Alternatively or additionally, on the basis of the lane 522 thus determined, at least one signal generator 201 of the (approaching) signaling unit 200 can be identified which is relevant to the (foreseeable) driving maneuver of the vehicle 100 at the node 500. The relevant signal generator 201 can be determined on the basis of map data with respect to the node 500, particularly as the signal generator 201 which is associated with the lane 522 thus determined and/or with the foreseeable driving maneuver of the vehicle 100. Exemplary driving maneuvers include a right turn-off, a left turn-off, or a straight-on maneuver.

The method 600 further comprises the operation 603 of the driving function at the node 500, according to whether at least one signal generator 201 of the signaling unit 200 at the node 500 is relevant to the driving maneuver of the vehicle 100 at the node 500, and/or in accordance with the signal generator 201 thus identified, particularly according to the signaling status (e.g. the color) of the signal generator 201. For example, automatic longitudinal control of the vehicle 100 across the node 500 can be executed, if the signal generator 201 identified indicates that the vehicle 100 is permitted to drive across the node 500. Alternatively, the vehicle 100 can be automatically decelerated to a halt, if the signal generator 201 identified indicates that the vehicle 100 is not admitted to the node 500.

By means of the measures described in the present document, in particular, a driving function for automated longitudinal control at a traffic node 500 can be provided in a particularly reliable and robust manner.

The present invention is not limited to the exemplary embodiments disclosed. In particular, it should be observed that the description and the figures are only intended to illustrate the principle of the proposed methods, devices and systems.

The invention claimed is:

1. A vehicle control system for operating a driving function for the automated longitudinal and/or lateral control of a motor vehicle at a traffic node, the vehicle control system comprising:
one or more sensors configured to provide situational data; and
a control unit configured to:
identify, in an approach road to the node, which lane of the approach road the vehicle is located in based on the situational data; and
operate the driving function to execute a driving maneuver at the node based on a determination of which signal generator of a signaling unit at the node is relevant to the driving maneuver of the vehicle at the node based on the identified lane in which the vehicle is located.

2. The vehicle control system of claim 1, wherein the control unit is further configured to:
identify the at least one signal generator of the signaling unit of the node which is relevant to the driving maneuver of the vehicle at the node based on the identified lane; and
operate the driving function at the node in accordance with the determined signal generator.

3. The vehicle control system of claim 2,
wherein the one or more sensors comprises one or more environmental sensors configured to provide environmental data, and
wherein the control unit is further configured to:
identify a signaling status of the identified signal generator, based on the environmental data, and
operate the driving function at the node in accordance with the determined signaling status of the identified signal generator.

4. The vehicle control system of claim 1, wherein the control unit is further configured to:
predict the driving maneuver which is to be executed by the vehicle at the node, based on the determined lane,
predict the driving maneuver based on map data that indicates one or more potential and/or permissible driving maneuvers for the determined lane;
select the driving maneuver that is to be executed by the vehicle at the node from a plurality of potential driving maneuvers comprising: a left turn-off maneuver, a straight-on driving maneuver, a right turn-off maneuver, and/or a U-turn driving maneuver, and
determine the relevant signal generator for the driving maneuver based on the predicted driving maneuver.

5. The vehicle control system of claim 1, wherein the control unit is further configured to:
determine map data with respect to the node, the map data indicating a profile of lanes in the approach road to the node upon which the vehicle is traveling, and
determine the lane in which the vehicle is located based on the map data.

6. The vehicle control system of claim 5, wherein the control unit is further configured to:
identify positional data with respect to the position of the vehicle relative to the lanes of the approach road to the node upon which the vehicle is traveling, based on:
the positions of one or more landmarks indicated in map data, wherein the one or more landmarks include: lane markings, posts, traffic signs and/or signal generators,
the relative position of the vehicle vis-à-vis the one or more landmarks at one or more sequential time points,
one or more sequential time points, with reference to a global position of the vehicle determined by means of a GNSS receiver, and/or
a positional change and/or positional adjustment of the vehicle between two or more time points identified by reference to a wheel speed sensor, an acceleration and/or rotational speed sensor, and/or a sensor for the determination of a visual odometry of the vehicle, and
identify the lane upon which the vehicle is located based on the identified positional data.

7. The vehicle control system of claim 1, wherein the control unit is further configured to:

determine map data with respect to the node, the map data indicating a map-based relative arrangement of various landmarks with respect to and/or in the environment of the node, determine a sensor-based relative arrangement of the various landmarks, based on environmental data from one or more environmental sensors of the vehicle, and identify the lane in which the vehicle is located, based on the map-based arrangement and based on the sensor-based arrangement.

8. The vehicle control system according to claim 7, wherein the control unit is further configured to:

identify a map-based relative position of the vehicle vis-à-vis the map-based arrangement based on environmental data, identify a sensor-based relative position of the vehicle vis-à-vis the sensor-based arrangement based on environmental data, and identify the lane in which the vehicle is located, based on the map-based relative position and the sensor-based relative position.

9. The vehicle control system of claim 1, wherein the control unit is further configured to:

identify map data with respect to the node point, the map data indicating an association of the various signal generators of the signaling unit with different potential driving maneuvers at the node and/or with the various lanes on the approach road to the node, and identify the signal generator which is relevant to the driving maneuver of the vehicle based on the association.

10. The vehicle control system of claim 1, wherein the control unit is further configured to:

establish a sensor-based environmental model of the node, based on environmental data from one or more environmental sensors of the vehicle, establish a map-based environmental model of the node, based on map data from a digital map of the node, and based on a comparison of the sensor-based environmental model with the map-based environmental model:
identify the lane on which the vehicle is located, and/or
identify the at least one signal generator that is relevant to the driving maneuver of the vehicle at the node.

11. The vehicle control system of claim 1, wherein the control unit is further configured to, depending upon whether at least one signal generator is relevant to the driving maneuver of the vehicle at the node, and/or in accordance with a signaling status of the signal generator which is relevant to the driving maneuver of the vehicle at the node:

execute the automated longitudinal and/or lateral control of the vehicle across the node, and/or execute the automated deceleration of the vehicle to a halt ahead of a stop line of the signaling unit.

12. The vehicle control system of claim 1, wherein the control unit is further configured to, in a manual mode of the driving function:

deliver an output by way of a proposal for the consideration of a relevant signal generator for the driving maneuver of the vehicle at the node in the automated longitudinal and/or lateral control of the vehicle at the signaling unit for the attention of a user of the vehicle via a user interface of the vehicle, consider the relevant signal generator for the driving maneuver of the vehicle at the node in the automated longitudinal and/or lateral control of the vehicle at the signaling unit, if the proposal is accepted by the user, and consider the relevant signal generator for the driving maneuver of the vehicle at the node in the automated longitudinal and/or lateral control of the vehicle at the signaling unit, if the proposal is not accepted by the user.

13. The vehicle control system of claim 1, wherein the control unit is further configured to:

establish whether the driving function is operating in an automatic mode or in a manual mode, automatically consider a signal generator which is relevant to the driving maneuver of the vehicle at the node in the automated longitudinal and/or lateral control of the vehicle at the signaling unit of the node, if the driving function is operating in the automatic mode, and only consider the relevant signal generator for the driving maneuver of the vehicle at the node in the automated longitudinal and/or lateral control of the vehicle at the signaling unit of the node in the event of feedback from a user of the vehicle, if the driving function is operating in the manual mode.

14. A method for operating a driving function for the automated longitudinal and/or lateral control of a motor vehicle at a traffic node, comprising:

identifying, in an approach road to the node, in which lane of the approach road the vehicle is located in;

operating the driving function to execute a driving maneuver at the node according to a determination of which signal generator of a signaling unit at the node is relevant to the driving maneuver of the vehicle at the node based on the identified lane in which the vehicle is located.

* * * * *